May 12, 1964 A. F. FAIRBANKS 3,133,133
METHOD OF MAKING LIGHT-WEIGHT CERAMIC STRUCTURES
Filed Dec. 5, 1960

AVARD F. FAIRBANKS
INVENTOR.

BY George C. Thompson
    agent.

United States Patent Office 3,133,133
Patented May 12, 1964

3,133,133
METHOD OF MAKING LIGHT-WEIGHT
CERAMIC STRUCTURES
Avard F. Fairbanks, Canoga Park, Calif., assignor to Thompson Ramo Wooldridge Inc., Canoga Park, Calif., a corporation of Ohio
Filed Dec. 5, 1960, Ser. No. 73,746
4 Claims. (Cl. 264—59)

This invention relates to a method of making light-weight ceramic structures and more particularly to a method of making an intricate light-weight support of high temperature ceramic material for forming a ceramic mirror.

A formation of mirrors and their support has generally involved, first, preparing a mold capable of receiving clay slip, glass, or the like in relatively heavy webbed forms for the purpose of providing adequate support and minimum distortion to the contour of the reflective surface. Such a mirror, however, is limited in its portability, since the heavy webs provide enormous amounts of weight if the mirror size is relatively large. Formation of a ceramic mirror in such a manner is shown in copending application of Avard F. Fairbanks and Stephen E. Johnston, Serial No. 715,379, filed February 14, 1958, entitled "Optical Mirrors," and assigned to the assignee of the present application.

It is therefore an object of this invention to provide a method of constructing very light-weight, rigid, ceramic mirror structures capable of withstanding high temperature.

It is another object of this invention to provide a method of allowing proper and accurate mirror shaping to a light-weight ceramic structure.

It is still another object of this invention to provide a method of forming a large number of integral, intricate, very thin ceramic support walls for a ceramic mirror.

It is another object of this invention to provide a relatively inexpensive method of producing a light-weight, strong, ceramic mirror structure.

Other objects, purposes, and characteristic features will become obvious as the description of the invention progresses.

In practicing this invention, there is provided a destructible or decomposable honeycomb structure having positioned thereon a destructible or decomposable surface sheet that is later shaped to a desired contour for use as a ceramic mirror form. The honeycomb and sheet structure is then coated with clay slip and baked to hardness, causing the destruction of the basic honeycomb and sheet structure upon which the clay slip is applied and leaving the combined ceramic honeycomb and sheet shaped structure.

The invention may best be understood by reference to the accompanying drawing, in which.

In each of the several views, similar parts bear like reference characters.

Figure 1:
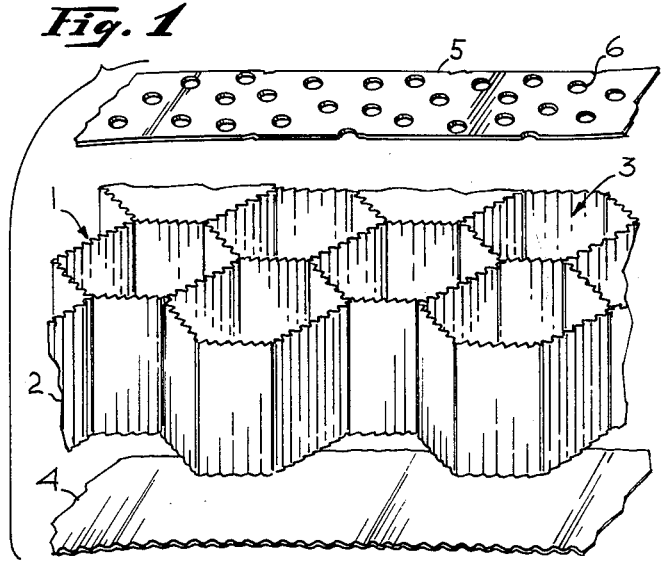
FIGURE 1 is an exploded view of the honeycomb structure upon which clay slip is applied.
Figure 2:
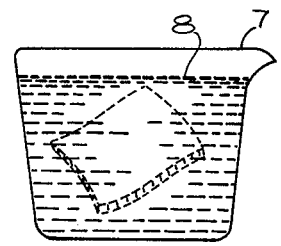
FIG. 2 is a view illustrating one method of applying the clay slip to the honeycomb structure.
Figure 3:
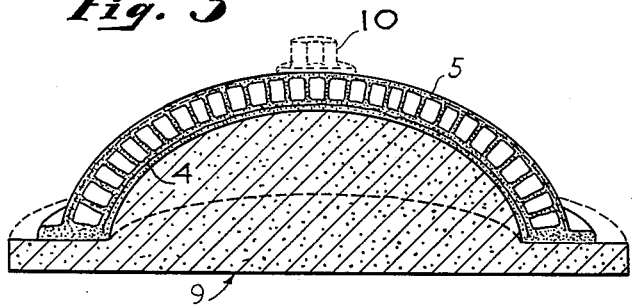
FIG. 3 illustrates the use of a properly contoured mold for forming the coated honeycomb structure into the desired shape.

In the illustration of FIG. 1, there is shown a decomposable or burnable honeycomb structure 1 in which the walls 2 of each of the honeycomb cells 3 are shown in a crinkled configuration to provide for distortion of each of the cells for the purpose of allowing the combined cell structure to conform to any desired formed shape. One plane of the open end of each of the cells 3 is covered with a suitable decomposable sheet surface material 4 of a solid nature, while the remaining plane established by the remaining open end of each of the cells of the honeycomb structure 1 is covered by a perforated sheet 5 also of a decomposable material. The sheet 5 is illustrated as having openings 6 therein capable of allowing gases to escape during the baking process during which the decomposable material of each of these members is consumed, as by burning. After the members 1, 4, and 5 have been selected, each member is dipped into a vat 7 filled with moist clay slip 8, as illustrated in FIG. 2, to cause each member to be coated with the clay slip on all surfaces thereof. After immersion or spraying (not shown) of the clay slip onto the members, the flat sheet 4 with its clay slip is placed over a suitable mold 9, as shown in FIG. 3, with the honeycomb 1 in a position thereover and with the perforated sheet 5 (following dipping into the clay slip) applied to the top surface of the honeycomb. At this time a suitable anchoring or support device 10 may be positioned on the contoured surface of the perforated sheet 5 and may be of any suitable material capable of being anchored by the hardening of the clay slip during the baking process.

Figure 4:
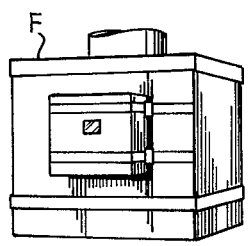
FIG. 4 is a view representing the baking operation into which the structure of FIG. 3 is introduced.
Figure 5:
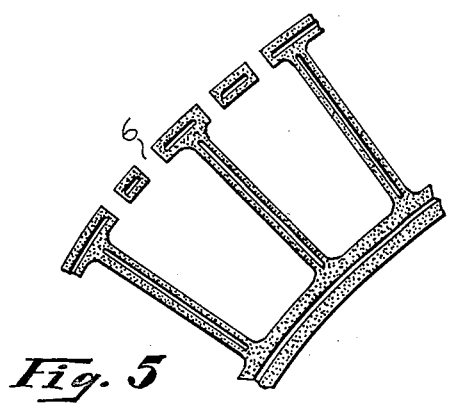
FIG. 5 is a detailed sectional view of a portion of the honeycomb structure showing the ceramic surface that is to be polished for application of a mirrored surface.

The entire clay slip covered structure is then allowed to partially dry to hold its shape and positioned within a suitable baking oven F shown in FIG. 4 and heated to a desired temperature and baked until the clay slip has formed into a ceramic of desired hardness of structure. At this time, sheet 4, honeycomb 1, and sheet 5 have each decomposed or burned, leaving only the clay slip that was positioned thereabout. As shown in FIG. 5, the decomposable material will leave thin layers of ceramic material having slots therein which were previously occupied by the decomposable material. Since the dipping process allowed only a small amount of the clay slip to cling to each of the decomposable members, the structure is extremely thin-walled, complex, and integral in nature. It is pointed out that it may be desirable to provide a heavier coating of clay slip on the decomposable sheet 4 prior to application to the mold for forming the mirrored surface. The extra material is then ground away to provide a smooth surface for reflective coating.

Figure 6:
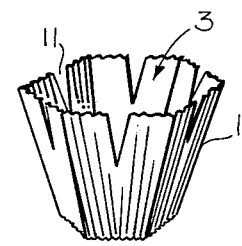
FIG. 6 is a showing of a modified honeycomb structure usable in forming the ceramic mirrors.

In FIG. 6 there is shown one cell 3 of a honeycomb 1 in which there is provided a plurality of slots 11 extending from the end of the cell 3 down toward the mid-span of each cell and in each wall of each cell to provide for expansion of each cell during contouring of the honeycomb to the mirror-forming mold. This arrangement is provided in lieu of crinkling the material, such as shown in FIG. 1.

While there has been described what is at present considered to be a preferred embodiment of the invention, it will be obvious to those skilled in the art that various changes and modifications may be made therein without departing from the invention, and it is aimed in the appended claims to cover all such changes and modifications as fall within the true spirit and scope of the invention.

What is claimed is:

1. A method of producing light-weight ceramic mirror support structures, comprising the steps of: coating a destructible crinkled honeycomb structure with clay slip; coating a destructible flexible sheet material with clay slip; placing the destructible sheet material on the destructible crinkled honeycomb structure; forming the sheet and honeycomb structure into a selected light focusing contour; and baking said coated and formed sheet and honeycomb structure until the clay slip forms a ceramic structure having the contour and shape of but substantially completely free of the destructible crinkled honeycomb structure and destructible sheet material.

2. A method of producing light-weight ceramic mirror support structures, comprising the steps of: coating a destructible slotted web honeycomb structure with clay slip; coating a destructible flexible sheet material with clay slip; placing the destructible sheet material on the destructible slotted web honeycomb structure; forming the sheet and honeycomb structure into a selected light focusing contour; and baking said coated and formed sheet and honeycomb structure until the clay slip forms a ceramic structure having the contour and shape of but substantially completely free of the destructible slotted web honeycomb structure and destructible sheet material.

3. In a method for producing light-weight ceramic mirror support structures, the steps of: coating a plurality of individually formed destructible structures with clay slip, at least a portion of said destructible structures being corrugated and arranged to delineate a honeycomb configuration; assembling said coated destructible structures to form a desired configuration for said support structure; and baking said coated and assembled destructible structures at a temperature sufficient to convert said clay slip to a ceramic and to destroy said destructible structures thus retaining said support structure having separated voids therein.

4. In a method for producing light-weight ceramic mirror support structures, the steps of: coating a plurality of individually formed destructible structures with clay slip, at least a portion of said destructible structures being corrugated and arranged to delineate a honeycomb configuration; assembling said coated destructible structures; forming said coated and assembled destructible structures into a desired light-focussing contoured configuration for said support structure; and baking said coated and assembled destructible structures at a temperature sufficient thermally to convert said clay slip to a ceramic and to destroy said destructible structures thus retaining said support structure having slot-like and separated voids therein.

References Cited in the file of this patent

UNITED STATES PATENTS

| | | |
|---|---|---|
| 2,369,006 | Banks | Feb. 6, 1945 |
| 2,569,163 | Graveley | Sept. 25, 1951 |
| 2,644,777 | Havens | July 7, 1953 |
| 2,919,483 | Graveley | Jan. 5, 1960 |
| 2,977,265 | Forsberg et al. | Mar. 28, 1961 |